Patented Jan. 30, 1934

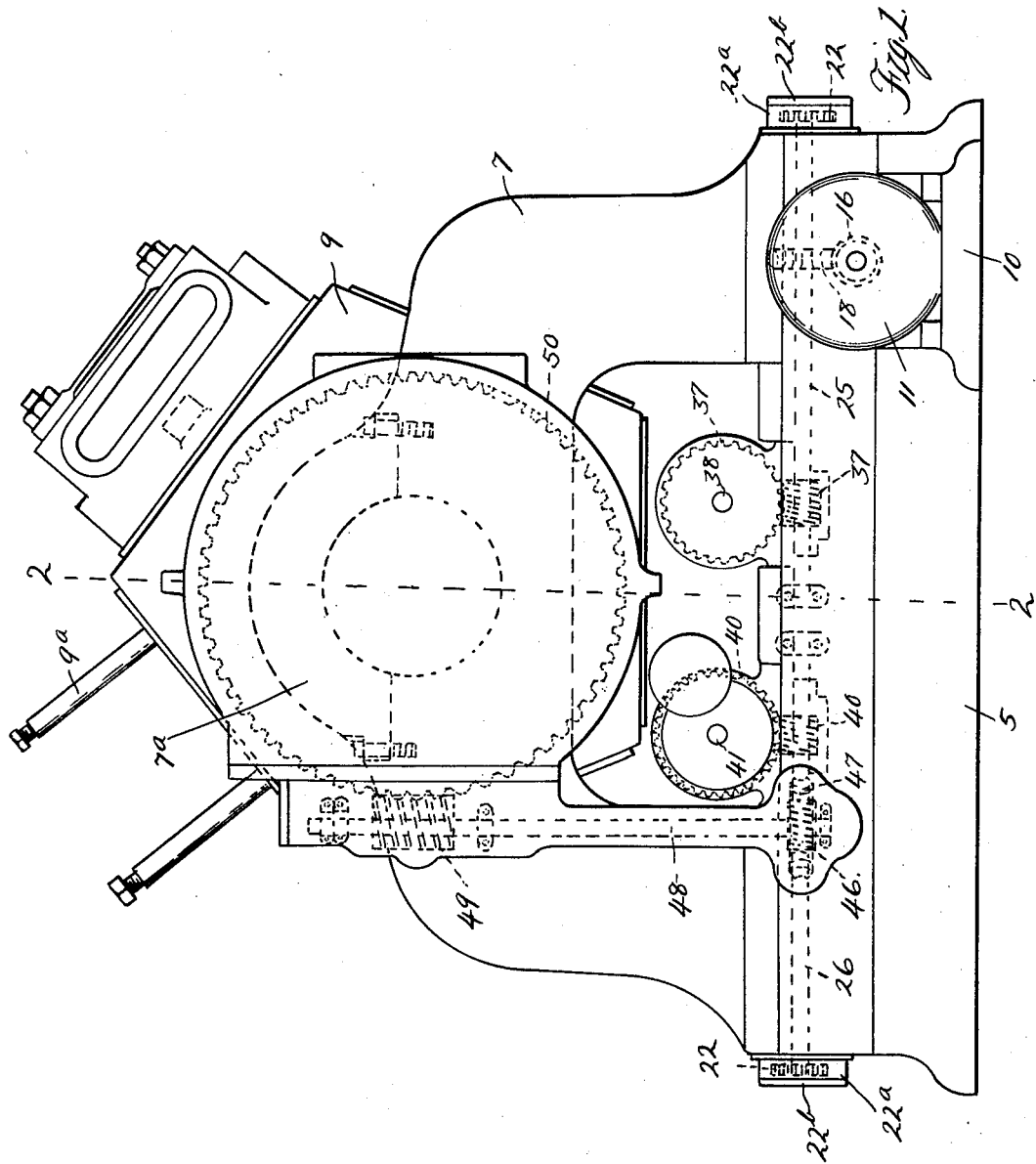

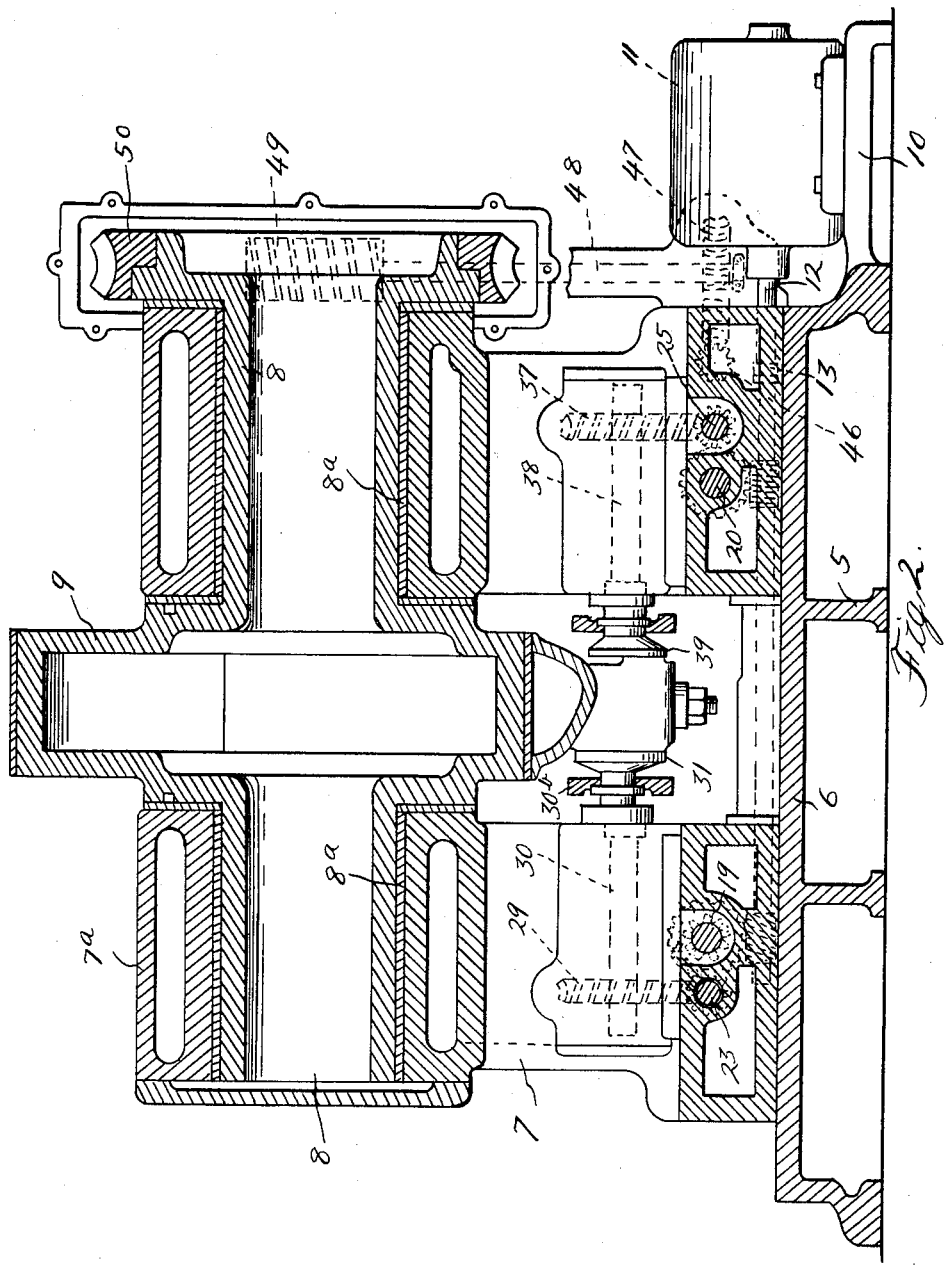

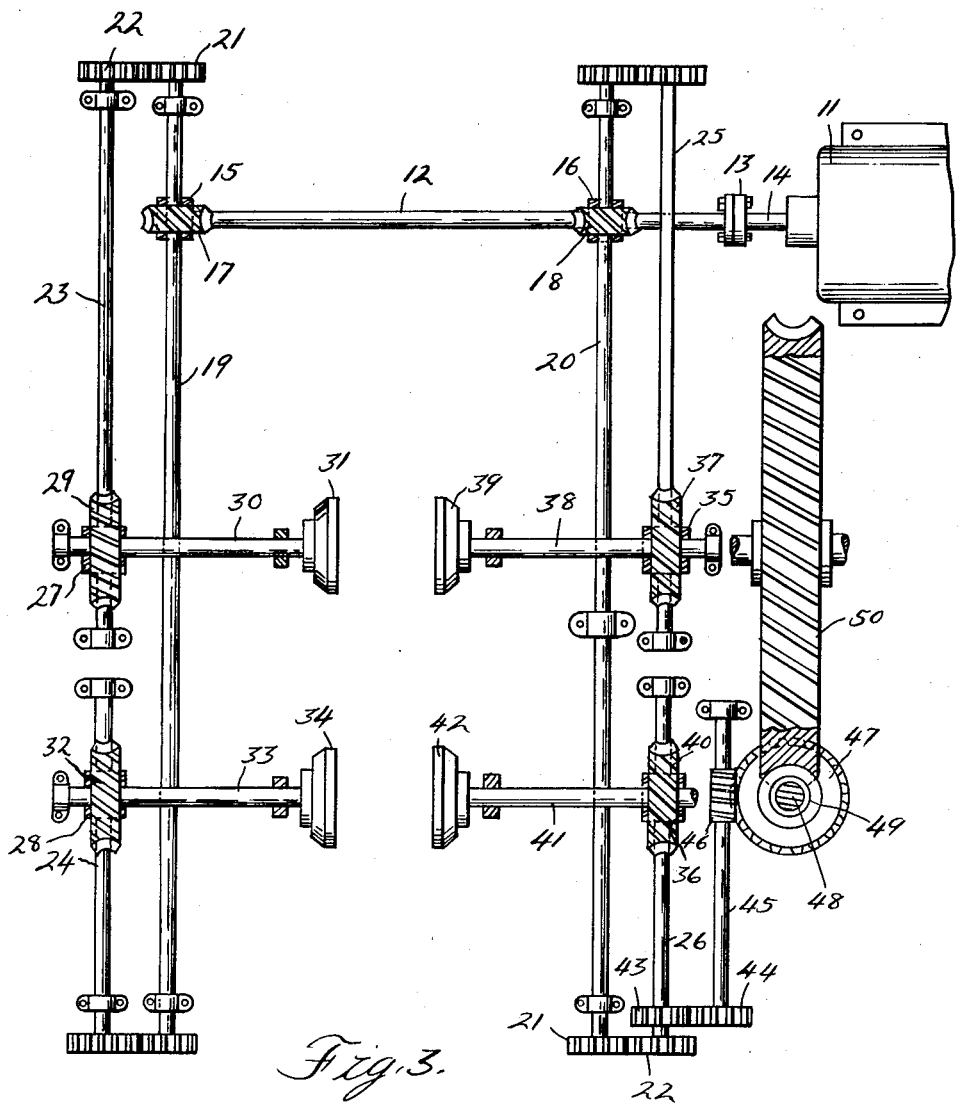

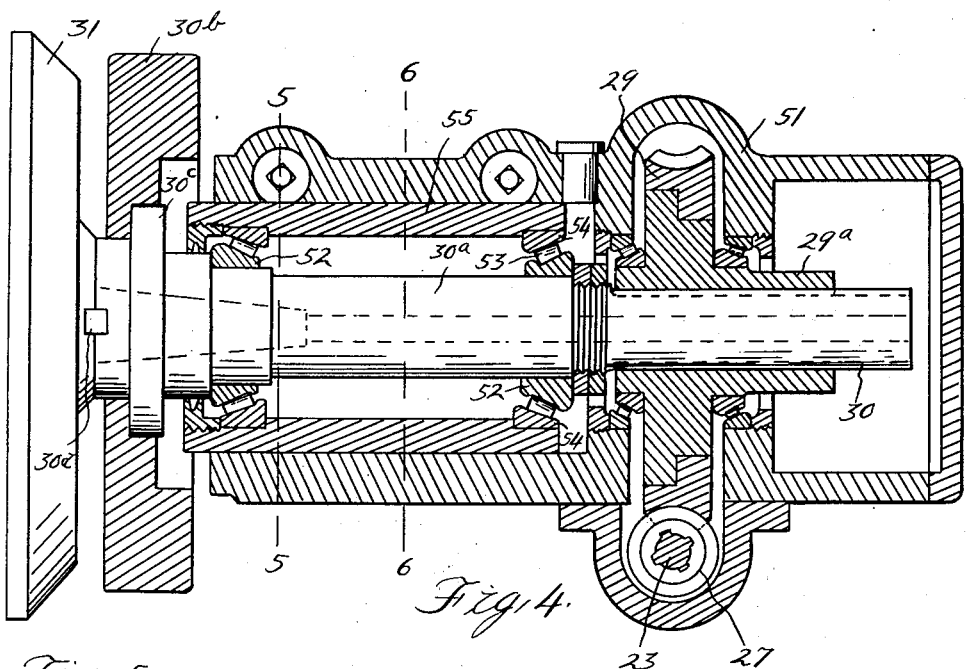
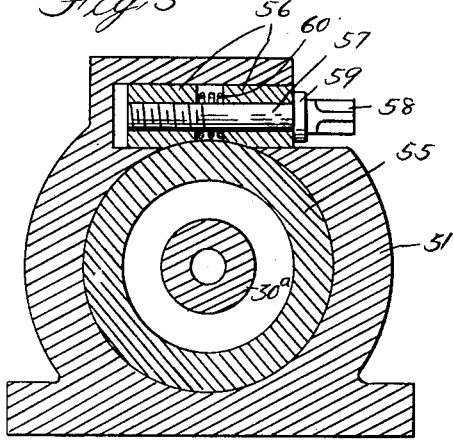
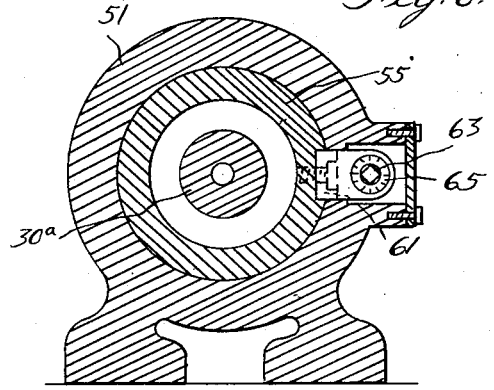
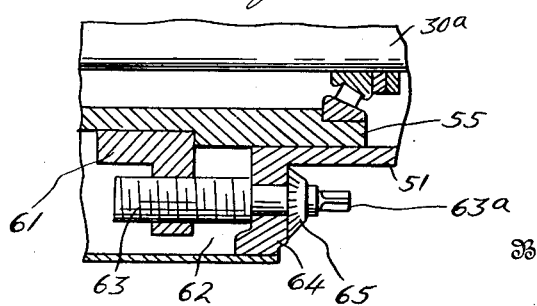

1,945,146

UNITED STATES PATENT OFFICE 1,945,146

MILLING MACHINE

Emmanuel J. Fournier, Detroit, Mich., assignor to Production Engineering Company, Detroit, Mich., a corporation of Michigan Application October 22, 1928. Serial No. 314,041

7 Claims. (Cl. 90—20)

This invention relates to milling machines, and more particularly to surface milling machines of the continuous production type, having a comparatively large drum or work-table, adapted to carry a number of parts to be milled, and continuously rotating to successively advance such parts past a plurality of cutters.

One of the objects of this invention is the provision of a simple, sturdy, milling machine, affording the requisite rigidity and accuracy, wherein the work-carrying drum and several cutters are rigidly mounted upon the base, and smoothly driven through worm and spur gears from a single electric motor or other source of power.

Another object of this invention is the arrangement in a continuous milling machine of a plurality of cutter units, driven simultaneously with the work-carrying drum, which may be combined in any desired combination of roughing and finishing cutters, and are separately adjustable vertically and horizontally to suitably position them toward and away from each other or the work-carrying drum.

A further object of this invention is the arrangement in a single housing of one or more cutter-carrying spindles so mounted that the spindles and cutters may be adjusted relatively to the housing through micrometer adjusting means, whereby, after rough adjustments have been effected by the positioning of the housing upon the base of the machine, accurate, fine adjustment of each cutter may be secured by moving its spindle relatively to the housing.

A further object of this invention is the provision of a fly wheel upon each cutter spindle to give constant momentum to the cutter and eliminate vibration, the fly wheel being mounted outside the cutter housing in close proximity to the cutter whenever practicable, but when the need of close positioning of adjacent cutters prevents the mounting of the fly wheels upon the same ends of their spindles, some of the fly wheels may be fastened upon the opposite ends of the spindles.

Other objects and advantages will be apparent from the following description, wherein reference is made to the accompanying drawings illustrating preferred embodiments of my invention, and wherein similar reference numerals designate similar facts throughout the several views.

In the drawings:—

Figure 1 is a side elevation of a milling machine constructed in accordance with my invention.

Figure 2 is an enlarged vertical sectional view, taken substantially on the line 2—2 of Figure 1.

Figure 3 is a diagrammatic view of the drive mechanism utilized for driving the work-carrying drum and a plurality of cutters in position to mill the work carried thereby.

Figure 4 is an enlarged vertical sectional view through one of the cutter housings.

Figure 8:
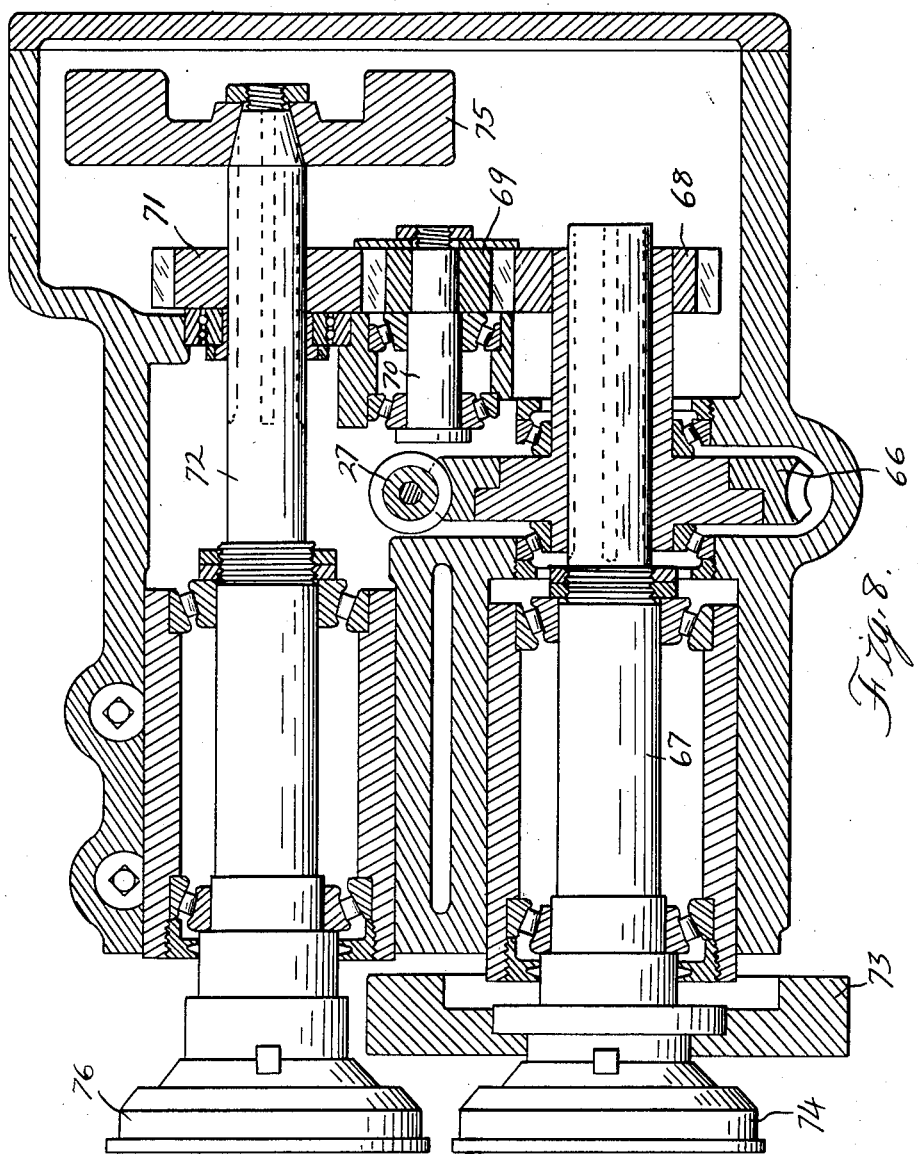

Figures 5 and 6 are detail sectional views taken substantially on the lines 5—5 and 6—6, respectively, of Figure 4.

Figure 7 is a detail horizontal section showing the micrometer adjusting means utilized in connection with the cutter illustrated in Figures 4—6, and Figure 8 is a central vertical section through a modified form of cutter housing wherein a pair of cutter spindles are mounted within a single housing.

Referring now to the drawings, the numeral 5 designates a base for my improved milling machine having a platform 6 for the support of the standards 7 in which the trunnions 8 of the work-carrying drum 9 are journaled. Adjacent one side, the base is formed with an extension seat 10 for conveniently mounting a motor 11 acting as the source of power in the present embodiment for driving the work-carrying drum as well as a plurality of cutters arranged to mill the work carried by the drum. Such drive mechanism is diagrammaticaly shown in Figure 3 and comprises a lateral shaft 12 connected through a suitable coupling 13 to the shaft 14 projecting from the motor 11, the shaft 12 carrying a pair of worm gears 15 and 16, respectively, meshing with worm pinions 17 and 18, fixed upon spaced longitudinal shafts 19 and 20 extending from the front to the rear of the milling machine. Each of these longitudinal shafts 19 and 20 are provided with spur gears 21 at their opposite ends, and the several spur gears 21 mesh with spur gears 22 arranged on the outer ends of a plurality of short shafts 23, 24, 25 and 26, respectively. The spur gears 21 and 22 may be of any desired number of teeth, and to permit of rapid change in the gear ratio, I preferably provide the gears 21 and 22 as pick-off gears and arrange them in housings 22a exterior of the base of the machine (note Figure 1) such housings being provided with removable end plates 22b to facilitate accessibility to the pick-off gears. The short shafts 23 and 24 are preferably arranged parallel with the shaft 19 and respectively carry worm gears 27 and 28. The worm gear 27 is adapted to mesh with a worm pinion 29 splined upon the spindle 30 of one of the cutters 31, while the worm pinion 28 likewise meshes with a worm pinion 32 splined upon the spindle 33 of another cutter 34. Similarly, the short shafts 25 and 26 are preferably arranged parallel to the longitudinal shaft 20 and respectively carry worm gears 35 and 36. The worm gear 35 meshes with a worm pinion 37 splined upon the spindle 38 of a cutter 39 while the worm gear 36 meshes with a worm pinion 40 splined upon the spindle 41 of another cutter 42. As shown in Figure 3, the cutters 31 and 34, extend from one side of the machine toward the center thereof in position to mill work carried upon the drum 10 and the cutters 39 and 42 extend from the opposite sides of the machine into position to mill the opposite side faces of the work carried by the rotatable drum 10. Means are provided for longitudinally adjusting the several cutters and their respective spindles to accurately position them according to the requirements of the work being milled, without interfering with the drive connections hereinafter described. It is also to be understood that while two cutters have been shown in the present embodiment as projecting from each side of the machine, any desired number of cutters can be employed on each side through suitable positioning of additional worm gears upon the respective longitudinally arranged shafts.

The driving of the work-carrying drum 9 from the motor 11 is herein shown as effected through the medium of the lateral shaft 12, longitudinal shaft 20 and short parallel shaft 26 hereinbefore described, a spur gear 43 being fixed upon the shaft 26 and meshing with the spur gear 44 fixed adjacent one extremity of the shaft 45 carrying the worm gear 46 meshing with the worm pinion 47 fixed on a vertical shaft 48 carrying the worm gear 49 meshing with the worm pinion 50 fixed upon a flange on one trunnion 8 of the work-carrying drum 9 (note Figure 2).

By virtue of this arrangement, the energization of the motor 11 will serve to rotate the work-carrying drum 9 at a comparatively low speed, and the several cutters at higher rates of speed, such speed ratio, however, being readily changed through the interposition of different pick-off gears 21 and 22 in connection with the cutters and through further change of the spur gears 43 and 44 in connection with the driving of the drum.

Any suitable means may be employed for rigidly securing the standards 7 on the base. As best shown in Figures 1 and 2, the standards 7 preferably comprise widely spaced hollow legs resting upon the base and joined at their upper extremities to form a saddle in which the trunnions 8 of the work-carrying drum revolve. A removable bearing cap 7ª carried by each standard 7 fits over the upper half of the bearing 8ª to completely encompass the trunnions 8. Obviously, after the removal of the bearing caps 7ª, the work-carrying drum may be lifted from the standards 7 and replaced with drums of different size to accommodate various sized parts to be milled. The work-carrying drum 9 is provided with a plurality of work-carrying surfaces, and any suitable means may be utilized for securing parts to be milled, such as the posts 9ª shown in Figure 1 upon these surfaces. In use, the drum 9 is continuously rotated at a comparatively slow rate of speed, the work to be milled being secured upon the surfaces of the drum when spaced from the cutters, and then after the drum has carried the work past the cutters, the work is removed from the drum and new parts to be milled secured upon the drum, all without stopping the rotation of the drum.

In Figure 4 I have illustrated a preferred embodiment of one of the cutter units. Each of the cutter units may comprise a housing 51 adapted to be suitably mounted upon the base 5 of the machine, as between the legs of one of the standards 7. Within the housing is arranged a spindle, as 30, and the worm pinion, as 29, splined on the spindle and meshing with the worm gear 27 fixed upon the short shaft 23. Forwardly of the worm pinion 29 the spindle 30 is formed with an enlarged portion 30a which carries a pair of inner bearing races 52 engaging circumferential series of bearings 53 which in turn engage bearing races 54 secured adjacent the opposite ends of a sleeve 55 mounted within the forward portion of the cutter housing 51 so that it may be slid longitudinally for purposes of adjustment of the spindle and associated cutter 31. As best shown in Figures 4 and 5, the sleeve 55 may be clamped in any adjusted position within the housing 51 through the medium of a pair of clamps mounted within the upper portion of the housing. Each clamp comprises a pair of slidable jaws 56 having beveled lower faces adapted to press upon the periphery of the sleeve 55 when moved toward each other through the action of the adjusting bolt 57. As herein shown, the bolt 57 is formed with a polygonal head 58 and a shoulder 59 engaging the outer edge of the adjacent clamp 56, the shank of the bolt passing through the adjacent clamp and being threaded into the opposite clamp. Rotation of the bolt 57 in one dirction will accordingly move the two clamps 56 toward each other against the tension of an intermediate spring 60 to exert a clamping action upon the sleeve 55, while rotation of the bolt in the opposite direction will serve to separate the clamping jaws 56 to free the sleeve 55, being aided in such movement of the clamping jaws by the spring 60. To permit the longitudinal sliding of the sleeve 55 and the spindle to secure the desired adjustment, means may be provided, such as are best illustrated in Figures 6 and 7. A bracket 61 is secured to the side of the sleeve 55 and extends laterally into a longitudinal groove 62 in the side of the cutter unit housing 51. The exterior portion of the bracket 61 is provided with a threaded aperture for the reception of the adjusting screw 63, the shank of which is journaled within an aperture in the rear wall 64 of the slot 62. The bolt 63 is preferably provided with a polgonal head 63ª exterior of the slot 62, and a graduated dial 65 may be secured on such exterior portion of the bolt in engagement with the rear face of the wall 64. The rear face of the wall 64 may also be marked with suitable indications to enable a micrometer adjustment of the bolt 63 to slide the bracket 61 and attached sleeve 55 longitudinally of the housing 51. During such longitudinal movement of the sleeve 55 the spindle 30 slides within the hub 29ª of the worm gear 29, the elongated spline permitting sliding movement of the spindle relatively to the worm gear without affecting the rotation of the spindle by such gear 29.

The cutter 31 is secured to the forward portion of the spindle 30 in any desired manner, and adjacent the cutter 31 is preferably mounted upon the spindle a fly wheel 30ᵇ to give constant momentum to the rotating spindle and eliminate vibration. As herein shown, I mount the fly wheel 30b upon the spindle by securing the central portion thereof to a flange 30c exterior of the housing 51, the forward face of the fly wheel terminating as close to the forward end of the spindle as can be expediently done while providing room for insertion of a pin 30d or other securing means for fastening the cutter 31 upon the spindle.

By virtue of the above described mechanism, means are provided for roughly adjusting the cutter housings relatively to the work carried upon the drum 9 by the mounting of the housings 51 upon the base 5 of the machine. Then fine adjustment of the cutters may be secured through the micrometer adjusting means, after which the clamping jaws 56 secure the cutters and their attached spindles in the desired adjusted positions. This arrangement facilitates the secural of the precise adjustment of the cutters needed for accurate machining while maintaining rigidity in the mounting of both the work-carrying drum and the several cutters utilized therewith.

In Figure 8 I have illustrated a modification of my improved cutter mounting arrangement, wherein a pair of cutter spindles and attached cutters may be mounted within a single housing and simultaneously driven through mechanism housed thereby. In this embodiment, the worm gear, as 27, meshes with the worm pinion, as 66, the elongated hub of which is suitably splined upon the spindle 67 and carries adjacent its rear extremity a spur gear 68 meshing with an intermediate gear 69 fixed upon a stub shaft 70 arranged substantially parallel with the spindle 67. The intermediate pinion 69 also meshes with the spur gear 71 splined upon the companion spindle 72 arranged substantially parallel with the spindle 67, whereby the two spindles will be rotated in the same direction at substantially the same speeds. The spindles and their driving gears are suitably mounted upon ball or roller bearings, and provision is made for the adjustment of each spindle, substantially as hereinbefore described in connection with the embodiment illustrated in Figures 4—7. In Figure 8 I have also illustrated an arrangement of cutter-carrying spindles wherein the spindles are so closely placed to each other that there is not sufficient clearaness to permit the positioning of fly wheels upon the spindles in juxtaposition to the cutters, I have accordingly arranged one of the fly wheels, as 73, upon one spindle, as 67, closely adjacent to the cutter 74, and the other fly wheel, as 75, is mounted upon the rear extremity of the supplemental spindle 72 remote from its cutter 76. This arrangement gives the benefit of the fly wheel to each spindle while permitting relatively close positioning of the cutters carried thereby.

From the foregoing, it will be apparent that I have devised a simple compact milling machine wherein any suitable number of cutters may be advantageously employed for performing work upon parts to be milled carried by various sized drums. The speed of the cutters may be varied to suit the requirements of the work to be done thereby, and the speed of the work-carrying drum may be varied at will. Force feed lubrication is to be employed throughout the machine, though the details of the lubrication system is not shown herein in its entirety. Also, it is to be understood that suitable clutches or the like may be interposed between the motors and the parts driven thereby as required by safety regulations or for the convenience of the operator.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

I claim:

1. In a milling machine of the drum type, a base, a pair of standards carried by the base and each having spaced supporting legs, a work-carrying drum journaled in the standards, cutter members supported by the base adjacent the drum between the spaced legs of the standards, a motor, means for driving the drum thereby, means connecting the motor to each cutter member to enable driving the same thereby, and including a pair of substantially coaxially disposed shafts carried by the base to one of which each cutter is geared and each having an end projecting from the base, another power transmitting shaft projecting from the base adjacent each projecting extremity of the first mentioned coaxial shafts, and pick-off gearing arranged between each such pair of projecting shaft ends, whereby the relative speed at which each cutter is driven by the motor through such gears may be changed at will by substitution of gears of varient dimensions.

2. In a machine of the character described, a frame including a substantially rectangular base, opposed uprights, a rotatable work-carrying drum journaled in the uprights, a plurality of cutter-carrying spindles carried by the frame adjacent the drum, means also carried by the base for simultaneously driving the drum and cutter spindles at different speeds, including a motor and reduction gearing between the motor and each cutter spindle, said reduction gearing including pairs of parallel shafts journaled in and having extremities extending beyond the sides of the frame and removable intermeshed gears secured on the projecting extremities of said shafts, through one pair of which each cutter spindle is drivable, the drum driving means being motivated by one of said parallel shafts.

3. In a milling machine, a cutter head, a pair of rotatable spindles journaled therein and having adjacent projecting ends, cutters carried thereby, one of the spindles having also a rearwardly projecting end, a flywheel mounted on the projecting end of one of said spindles adjacent the cutter, a flywheel mounted on the rearwardly projecting end of the other spindle, a pinion splined upon each spindle, means for rotating the spindles thru said pinions, and micrometer adjusting means for independently longitudinally moving the spindles relatively to the housing to position the cutters.

4. In a machine of the character described, a cutter head housing, a pair of rotatable shafts journaled therein in parallel juxtaposition, cutters carried by adjacent ends of the shafts, a pair of shaft-supporting sleeves mounted for sliding movement within the housing, roller bearings arranged interiorly of each sleeve, said spindles being mounted to rotate in said bearings and each being removably connected with a cutter, the cutters being in close proximity, a flywheel mounted on one of said spindles adjacent the cutter, a flywheel mounted on the other spindle adjacent its end farthest from the cutter, means for rotating the spindles including a pinion splined upon each spindle, and means for sliding the sleeves and bearings relatively to the housing to adjust the position of the spindles and cutters.

5. In a milling machine, a rotatable cutter, and cutter operating mechanism including a housing, a spindle mounted in and projecting from the housing, and removably carrying the cutters upon its projecting end, a pinion splined upon the spindle, means for rotating the spindle thru said pinion, and a flywheel secured upon the spindle outside the housing and closely adjacent the cutter.

6. In a milling machine of the drum type, a frame including a base, a pair of standards carried by the base, a work-carrying drum journaled on a substantially horizontal axis in said standards, rotatable cutter members supported by the base adjacent the drum, a motor, means for driving the drum thereby, a shaft drivable by the motor extending substantially horizontally thru and projecting at each end from the frame, a pair of substantially coaxial shafts for driving the cutters, each having an end projecting from the frame, adjacent one of the projecting ends of the first mentioned shaft, and pick-off gearing arranged between each such pair of projecting shaft ends, whereby the relative speed at which each cutter is driven by the motor may be independently changed at will.

7. In a milling machine of the drum type, a frame including a base, a pair of upstanding standards carried by the base and each having spaced legs, a work-carrying drum journaled on a substantially horizontally axis in the standards, a plurality of rotatable cutter members supported by the base between the spaced legs and adjacent the drum, a motor, means for driving the drum thereby, a shaft traversing the base beneath one of said standards substantially horizontally and projecting from the frame, said shaft being drivable by the motor, a pair of spaced but substantially coaxial shafts thru each of which one of the cutters is drivable, each of said shafts having an end projecting from the base adjacent one of the projecting ends of the first mentioned shaft, and pick-off gears arranged upon each pair of projecting shaft ends so formed, whereby the relative speed at which each cutter is driven by the motor may be independently changed at will.

EMMANUEL J. FOURNIER.